United States Patent
Kim

(10) Patent No.: US 9,055,842 B2
(45) Date of Patent: Jun. 16, 2015

(54) COOKING CONTAINER FOR ELECTRONIC OVEN

(71) Applicant: Dongbu Daewoo Electronics Corporation, Seoul (KR)

(72) Inventor: Han Ju Kim, Bucheon-si (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 0 days.

(21) Appl. No.: 14/086,740

(22) Filed: Nov. 21, 2013

(65) Prior Publication Data

US 2014/0319151 A1    Oct. 30, 2014

(30) Foreign Application Priority Data

Apr. 30, 2013 (KR) .................. 10-2013-0047942

(51) Int. Cl.
*A47J 36/34* (2006.01)
*A47J 36/02* (2006.01)
*A47J 27/00* (2006.01)

(52) U.S. Cl.
CPC ............... *A47J 36/34* (2013.01); *A47J 36/027* (2013.01); *A47J 27/002* (2013.01)

(58) Field of Classification Search
CPC .......... A47J 36/00; A47J 36/06; A47J 36/34; A47J 27/002
USPC ......... 220/573.1, 912, 913; 99/422, 444–447, 99/450
See application file for complete search history.

(56) References Cited

U.S. PATENT DOCUMENTS

| | | | | | |
|---|---|---|---|---|---|
| 3,439,603 | A | * | 4/1969 | Reames | 99/355 |
| 4,197,611 | A | * | 4/1980 | Bell et al. | 220/753 |
| 4,979,440 | A | * | 12/1990 | Latour et al. | 99/445 |
| 5,357,850 | A | * | 10/1994 | Coudurier | 99/422 |
| 5,365,833 | A | * | 11/1994 | Chen | 99/447 |
| 5,503,063 | A | * | 4/1996 | Sebald | 99/447 |
| 6,360,654 | B1 | * | 3/2002 | Cornfield | 99/339 |
| 6,647,865 | B2 | * | 11/2003 | Holl | 99/339 |
| 6,782,801 | B1 | * | 8/2004 | Correa et al. | 99/340 |

* cited by examiner

*Primary Examiner* — Anthony Stashick
*Assistant Examiner* — Mollie Llewellyn

(57) ABSTRACT

A cooking container for an electronic oven includes a housing unit having an entrance through which hot air enters; and a support unit on the housing unit, configured to have placed thereon one or more cooking objects to be cooked by the hot air.

11 Claims, 20 Drawing Sheets

COOKING CONTAINER FOR ELECTRONIC OVEN

CROSS-REFERENCES TO RELATED APPLICATIONS

The present application claims priority under 35 U.S.C 119(a) to Korean Patent Application No. 10-2013-0047942 filed on Apr. 30, 2013 in the Korean Intellectual Property Office, which is incorporated herein by reference in its entirety.

BACKGROUND

Exemplary embodiments of the present disclosure relate to a cooking container for an electronic cooker, and more particularly, to a cooking container for an electronic cooker or oven which can fry foods using hot air.

In general, fried food is prepared by coating various foods such as fish, meat and vegetables with flour or frying powder and then frying the coated materials in oil.

Since oil used in frying may easily oxidize, it should be frequently exchanged with new oil. In this regard, since difficulties exist in keeping and reusing the oil once used in frying, the cooking cost may be likely to increase.

The background art of the present disclosure is disclosed in Korean Unexamined Utility Model Publication No. 1998-0044155 (published on Sep. 25, 1998 and entitled "Continuous Automatic Food Fryer").

In the case of frying a cooking object using oil, since the oil is heated to a high temperature, the probability of a safety-related accident such as a burn increases. Also, in the case where it is necessary to defrost and fry a cooking object, defrosting and frying should be carried out in separate cooking containers, which may be cumbersome or inconvenient. Further, in frying, because heat is applied more to the outside than to the inside of the cooking object, the inside and the outside of the cooking object may not be evenly cooked. Therefore, a solution to these problems is desired.

SUMMARY

One or more embodiments of the present invention relate to a cooking apparatus that can fry foods using the fat in the food (e.g., the cooking object), thereby preventing the occurrence of a safety-related accident due to oil having a high temperature.

One or more other embodiments of the present invention relate to a cooking container for an electronic oven which can evenly cook the inside and the outside of a cooking object when frying the cooking object.

In one embodiment, a cooking container for an electronic oven includes a housing unit having an entrance through which hot air enters; and a support unit on the housing unit, configured to support one or more cooking objects to be cooked by the hot air.

The cooking container may further include a cover covering the support unit and/or blocking movement of the hot air.

The housing unit may include a housing body with the entrance at a lower portion thereof, and open at an upper end thereof; and legs supporting the housing body.

The housing body may include a housing side section supporting a periphery of the support unit, and extending downward; a housing bottom section extending inwardly from the housing side section from a lower end of the housing side section; and a housing inside section extending upward from the housing bottom section, connected to the entrance.

The housing side section may have a rounded contour, and may slope towards the housing body in a downward direction.

The upper end of the housing body may be at a position and/or a height the same as or higher than a hot air supply unit through which the hot air is discharged (e.g., towards a side of the housing body).

The housing bottom section may have an annular shape, and the legs may be fixed to the housing bottom section.

An introduction space may be inside the housing inside section, and connected to the entrance; and the housing inside section facing the introduction space may have a convex and/or curved shape.

The housing body may further include guides having a spiral shape on a surface of the housing inside section facing the introduction space, configured to guide rotation of the hot air.

The housing unit may include a housing body with the entrance at a side portion thereof, and open at an upper end thereof; and legs supporting a bottom portion of the housing body.

The housing body may include a housing side section supporting a periphery of the support unit, and having a plurality of entrances along a circumference thereof; and a horizontal housing bottom section on or at a lower end of the housing side section.

The upper ends of the entrances may have a height the same as or lower than a height of an upper end of a hot air supply unit from which the hot air is discharged (e.g., towards a side of the housing body).

The housing body may further include inner guides inside the housing side section, configured to guide movement of the hot air (e.g., from the entrances).

The inner guides may project or slope toward an inside of the housing side section from one end of the entrances in a horizontal direction.

The support unit may include a support body with a plurality of through-holes through which the hot air flows; and a cover configured to cover an outer periphery of the support body.

The support body may include a peripheral support inside the cover section, and having an annular shape; a central support at a center portion of the support body, inside the peripheral support part; a plurality of first support parts having first through-holes through which the hot air passes, and spirally extending from the central support part toward the peripheral support part; and second support parts between adjacent first support parts, having a plurality of second through-holes through which the hot air passes.

The second support parts may project or extend downward more than the first support parts.

The second support parts may include rounded support portions having an arc-like shape and a convex upward shape, while being centered on the central support part.

The cover unit may include a cover body closing the upper end of the support unit, and having a dome-like shape; and a knob member on (e.g., extending upward from) the cover body section.

Each of the legs may include a wire-shaped leg frame fixed to an outer surface of the housing unit; and a leg cover surrounding and/or receiving the leg frame.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
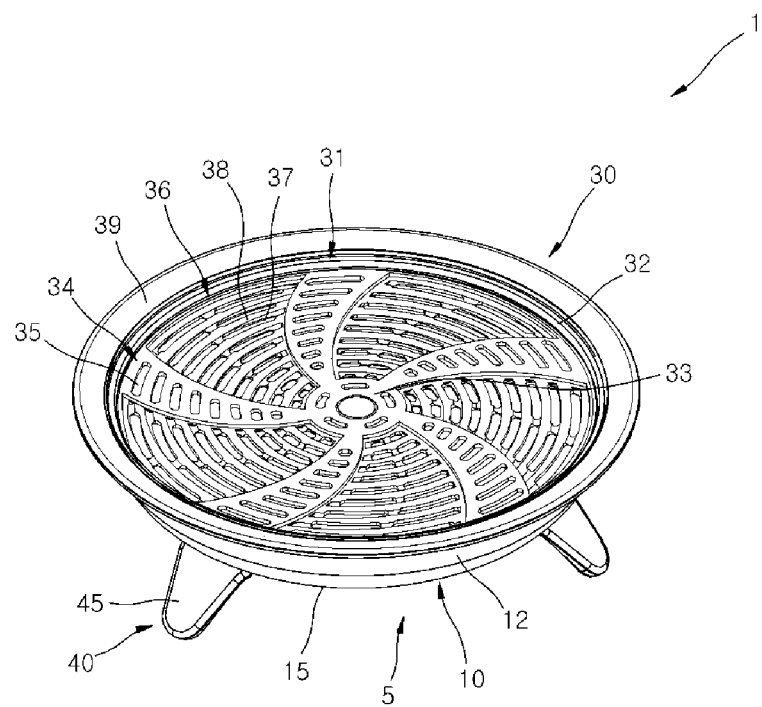
FIG. 1 is a perspective view schematically illustrating an exemplary cooking container for an electronic oven in accordance with one or more embodiments of the present disclosure.
Figure 2:
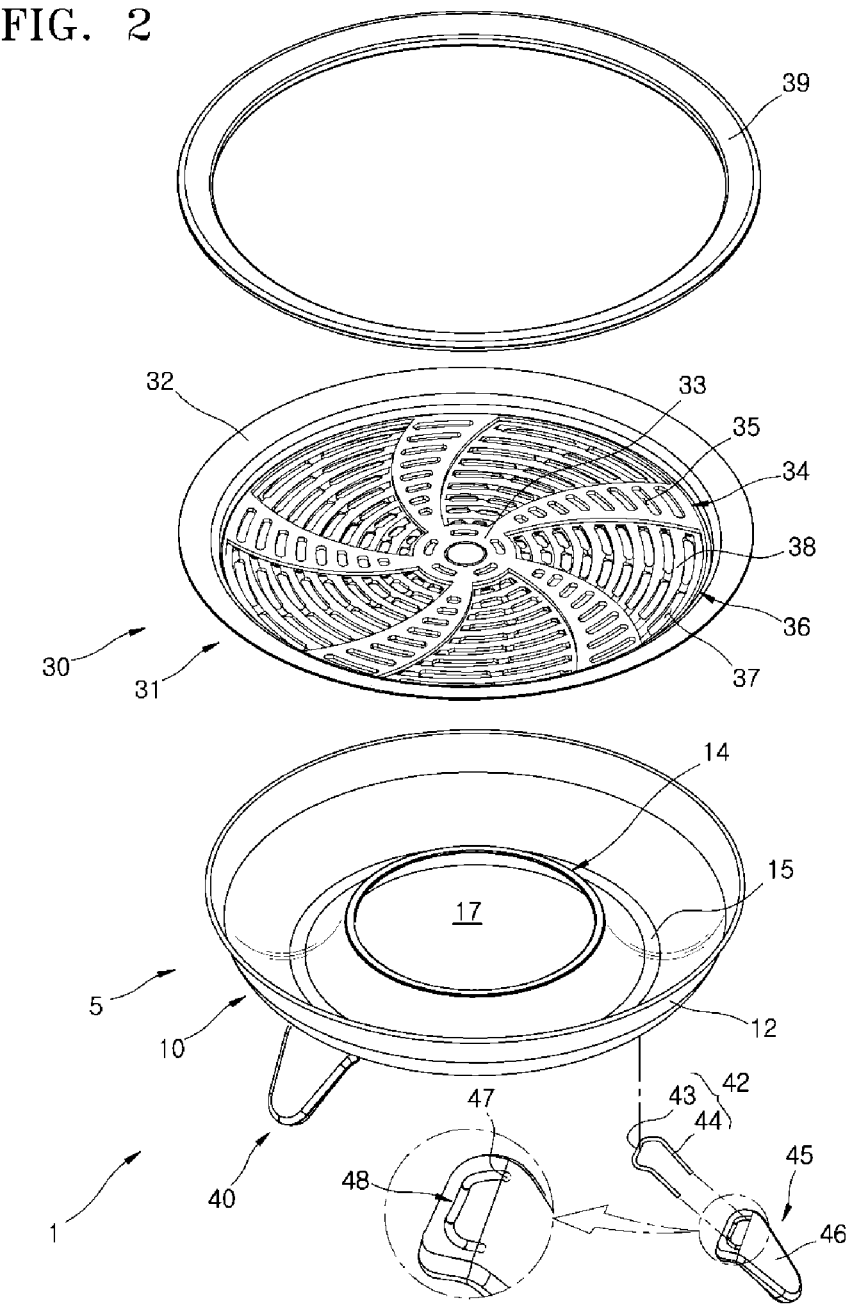
FIG. 2 is an exploded perspective view schematically illustrating the exemplary cooking container for an electronic oven in accordance with embodiment(s) of the present disclosure.
Figure 3:
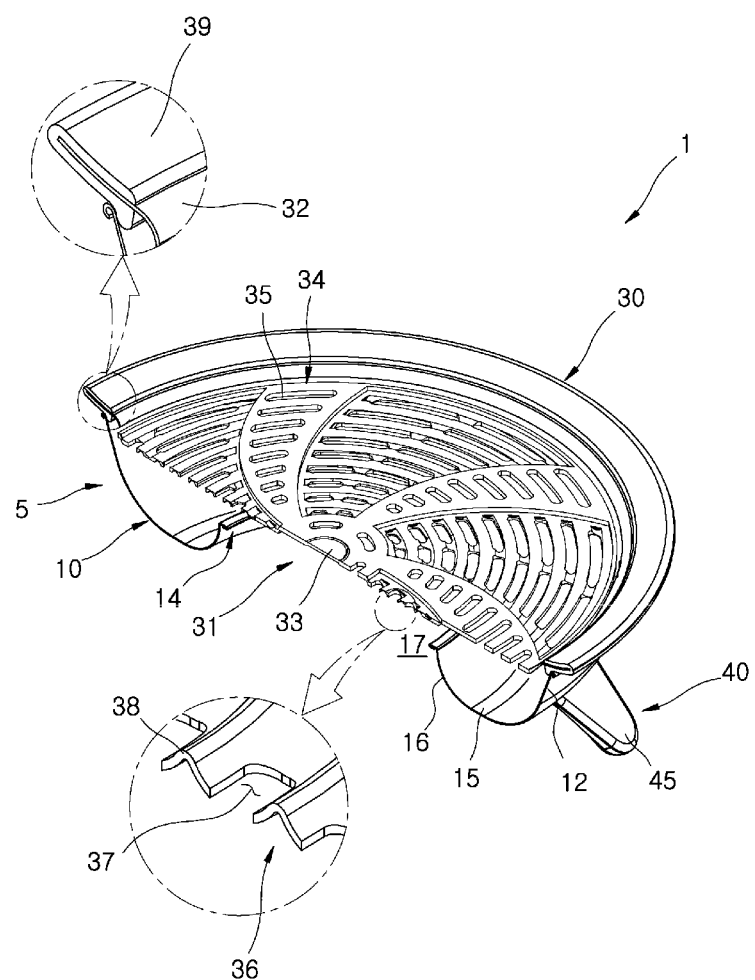
FIG. 3 is a cut-away perspective view schematically illustrating the exemplary cooking container for an electronic oven in accordance with the first embodiment of the present disclosure.
Figure 4:
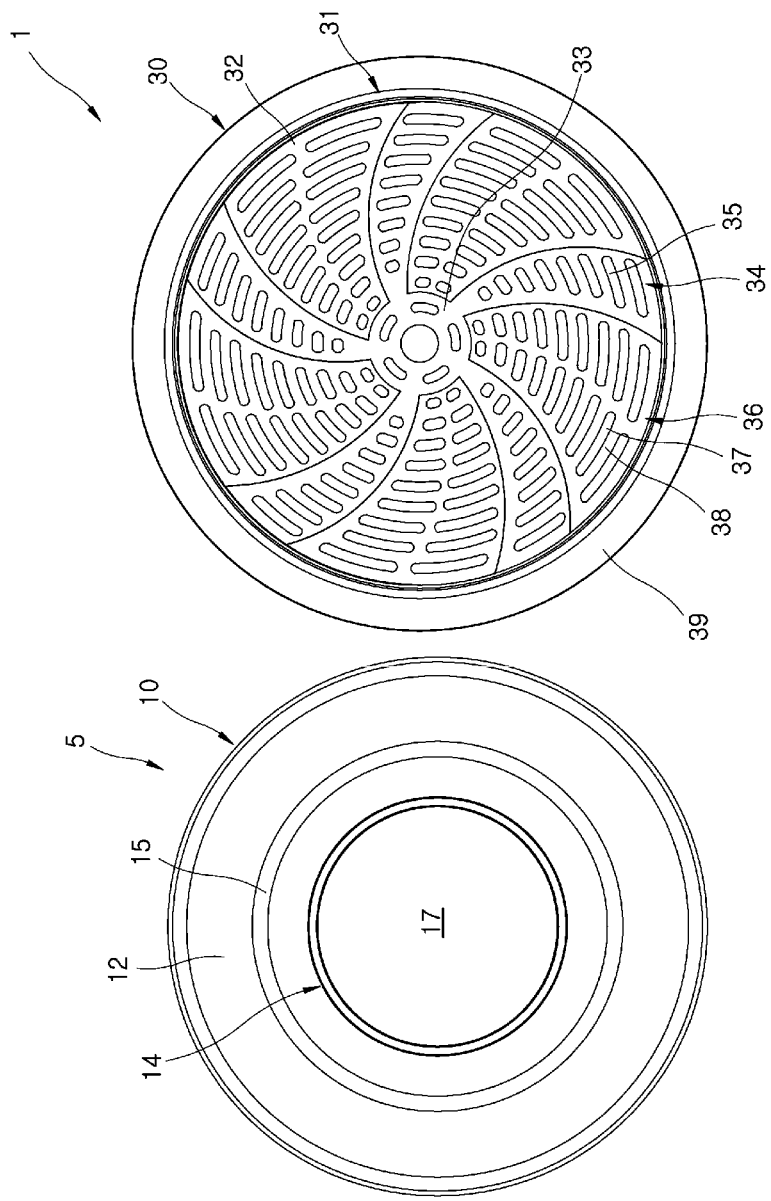
FIG. 4 is a plan view illustrating an exploded housing body and support unit in the exemplary cooking container for an electronic oven in accordance with embodiment(s) of the present disclosure.
Figure 5:
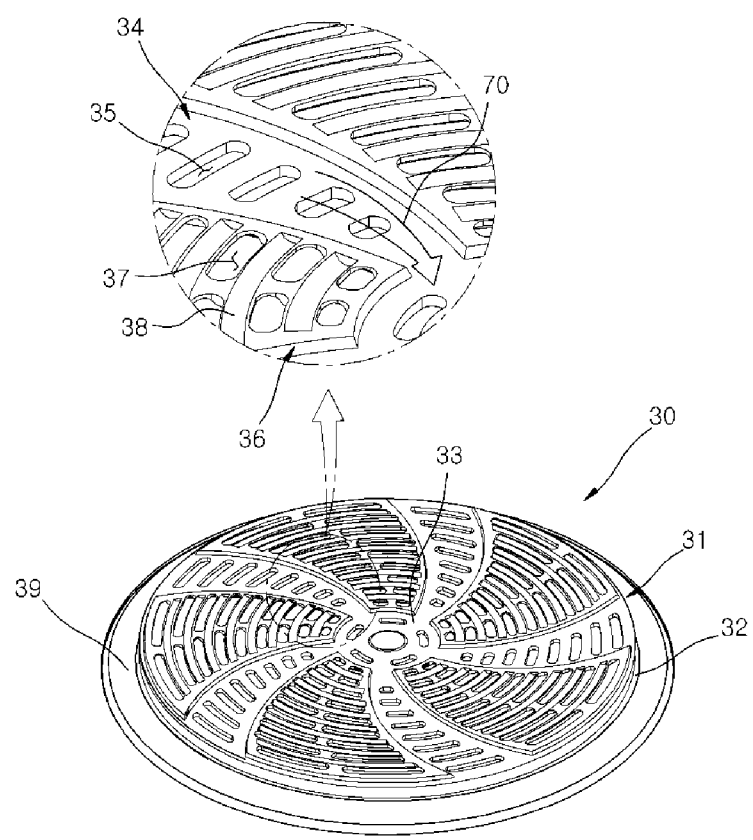
FIG. 5 is a perspective view schematically illustrating the rear surface of the support unit in the exemplary cooking container for an electronic oven in accordance with embodiment(s) of the present disclosure.
Figure 6:
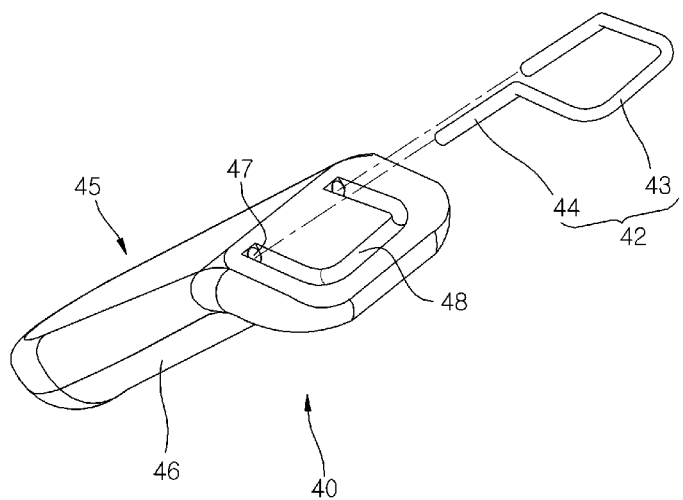
FIG. 6 is an exploded perspective schematic view illustrating an exemplary leg frame and leg cover in the cooking container in accordance with embodiment(s) of the present disclosure.
Figure 7:
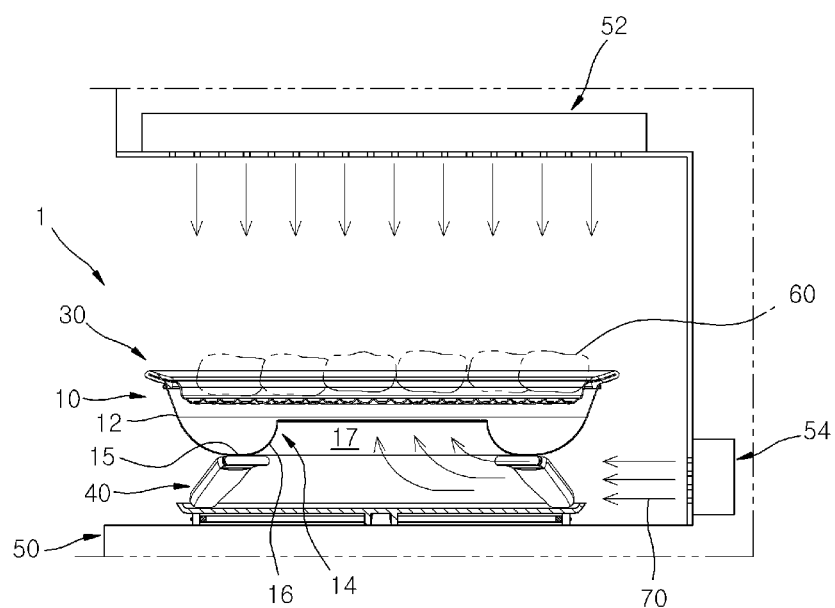
FIG. 7 is a view schematically illustrating the exemplary cooking container in accordance with embodiment(s) of the present disclosure in an electronic oven during frying.
Figure 8:
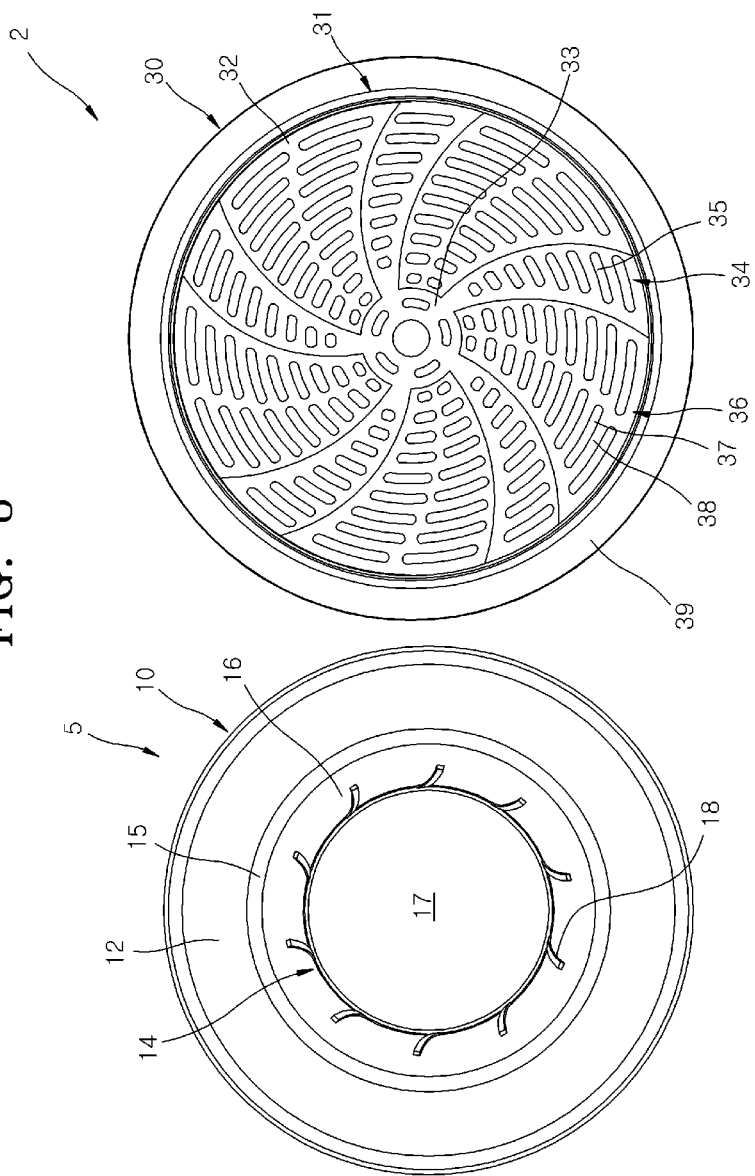
FIG. 8 is a plan view illustrating a variation of the housing body in the exemplary cooking container for an electronic oven in accordance with embodiment(s) of the present disclosure.
Figure 9:
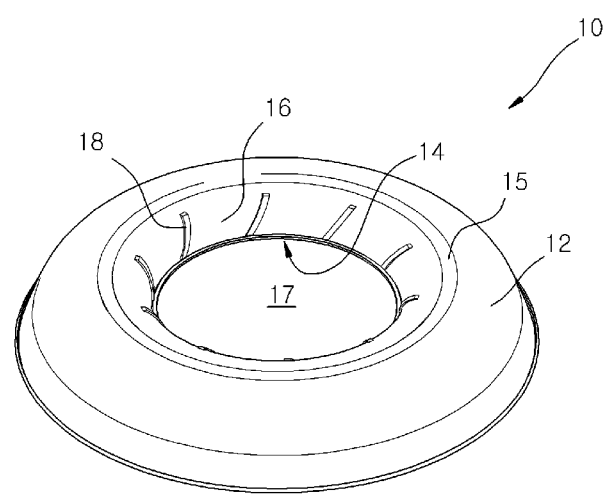
FIG. 9 is a perspective view illustrating the variation of the housing body in the exemplary cooking container for an electronic oven in accordance with embodiment(s) of the present disclosure.

FIG. 1 is a perspective view schematically illustrating an exemplary cooking container for an electronic oven in accordance with one or more embodiments of the present disclosure, FIG. 2 is an exploded perspective view schematically illustrating the exemplary cooking container for an electronic oven in accordance with embodiment(s) of the present disclosure, FIG. 3 is a cut-away perspective view schematically illustrating the exemplary cooking container for an electronic oven in accordance with the first embodiment of the present disclosure, FIG. 4 is a plan view illustrating an exploded housing body and support unit in the exemplary cooking container for an electronic oven in accordance with embodiment(s) of the present disclosure, FIG. 5 is a perspective view schematically illustrating the rear surface of the support unit in the exemplary cooking container for an electronic oven in accordance with embodiment(s) of the present disclosure, FIG. 6 is an exploded perspective schematic view illustrating an exemplary leg frame and leg cover in the cooking container in accordance with embodiment(s) of the present disclosure, FIG. 7 is a view schematically illustrating the exemplary cooking container in accordance with embodiment(s) of the present disclosure in an electronic oven during frying, FIG. 8 is a plan view illustrating a variation of the housing body in the exemplary cooking container for an electronic oven in accordance with embodiment(s) of the present disclosure, and FIG. 9 is a perspective view illustrating the variation of the housing body in the exemplary cooking container for an electronic oven in accordance with embodiment(s) of the present disclosure.

Referring to FIGS. 1, 2 and 7, a cooking container 1 for an electronic oven in accordance with one or more embodiments of the present disclosure includes a housing unit 5 which has an entrance 14 through which hot air 70 passes, and a support unit 30 on the housing unit 5 and on which one or more cooking objects 60 to be cooked by the hot air 70 is placed.

The cooking object(s) 60 are placed on the support unit 30, and the housing unit 5 is under the support unit 30. Since the housing unit 5 which supports the support unit 30 has a central entrance 14, the hot air 70 may enter the housing unit 5 through the entrance 14.

The housing unit 5 may have one or more of a variety of shapes without departing from a technical concept that it defines air flow paths for the hot air 70 supplied through the entrance 14 to heat the cooking object(s) 60 on the support unit 30.

Referring to FIGS. 2 to 4 and 7, the housing unit 5 in accordance with one or more embodiments includes a housing body 10 with the entrance 14 at a lower portion and/or center thereof. The housing unit 5 is opened at the uppermost end or surface thereof, and further includes leg sections (legs) 40 which support the housing body 10.

The leg sections 40 which extend downward from the housing body 10 are placed on a turntable or a bottom portion of an electronic oven 50.

The entrance 14 is at the lower portion or underside of the housing body 10, and the hot air 70 flowing from a side of the cooking container 1 for an electronic oven enters the lower portion of the housing body 10 and flows toward the upper portion of the housing body 10.

A space under the housing body 10 exists because the housing body 10 is supported by the leg sections 40. As a result, the flow of air moving to the inside of the housing body 10 through the lower portion of the housing body 10 may be smoothly implemented.

The housing body 10 includes a housing side section 12, the entrance 14, a housing bottom section 15, a housing inside section 16, an introduction space 17, and optional guide projections 18.

The housing side section 12 supports the periphery of the support unit 30 and has a shape which extends downward.

When viewed from the top, the housing side section 12 which forms the side surface of the housing body 10 has a circular or ring shape, and when viewed from the side, has a rounded contour or curved cross-section, which may be rounded from the uppermost end or surface to the lowermost end or surface of the housing side section 12.

Since the housing side section 12 has a rounded contour and curves inwardly towards the housing body 10 in a downward direction, the hot air 70 flowing from the side of the housing body 10 toward the housing side section 12 may be guided downward towards the underside of the housing side section 12, whereby the cooking time may be reduced or shortened.

That is, since the housing side section 12 is sloped and/or has a rounded shape, the hot air 70 supplied in a sideward direction towards the housing body 10 may be easily introduced into the housing body 10 through the entrance 14 at a lower portion or underside of the housing body 10, the amount of hot air 70 flowing into the entrance 14 may be increased, by which loss of hot air 70 may be reduced.

The housing bottom section 15 connected to and/or integral with the lowermost end or surface of the housing side section 12 extends inwardly from the lowermost end or surface of the housing side section 12.

The housing bottom section 15 extends horizontally from the lowermost end or surface of the housing side section 12 and has an annular shape. The leg sections 40 are fixed to the lowermost surface of the housing bottom section 15.

Since the leg sections 40 are abutted on the housing bottom section 15 which extends horizontally, the contact area between the leg sections 40 and the housing bottom section 15 may be increased or maximized, by which fixing or securing the leg sections 40 to the housing body 10 may be stably implemented.

The housing inside section 16 which extends upward from the housing bottom section 15 defines, at the uppermost end or surface thereof, the entrance 14 through which the hot air 70 enters the cooking container 1.

The introduction space 17 which communicates with the entrance 14 is in the housing inside section 16. The housing inside section 16 which defines the introduction space 17 has a convex and/or curved shape.

Because the introduction space 17 is under the entrance 14, and the housing inside section 16 defining the introduction space 17 has a convex curved shape, the flow of hot air 70 through the housing inside section 16 to the entrance 14 may be stably implemented.

Since the housing inside section 16 may have a funnel shape (or inverse funnel shape) which decreases with distance from the surface on which the cooking container 1 is placed, the hot air 70 which flows upward through the housing inside section 16 may smoothly enter the housing body 10 through the entrance 14.

The uppermost end or surface of the housing body 10 in accordance with various embodiments is at a position and/or height (e.g., a distance from the bottom wall of the cooking chamber) the same as or higher than the lower introduction hole section through which the hot air 70 is discharged toward the side of the housing body 10. As a result, the hot air 70 may be easily supplied into the housing body 10 through the lower end or underside of the housing body 10.

A hot air supply unit 54 has a plurality of holes through which the hot air 70 is discharged. The hot air supply unit 54 is at a lower part in the electronic oven 50.

The holes of the hot air supply unit 54 communicate with the inside or interior of the electronic oven 50. Such holes may form a plurality of rows and/or be in a horizontal direction at a lower part of the inside of the electronic oven 50 (e.g., along a bottom half of the rear wall or panel of the electronic oven 50, which may be a convection oven, a microwave oven, or a combination thereof).

The height of the holes at the upper end of the hot air supply unit 54 may be the same as or lower than the height of the upper end of the housing body 10.

In the case where the height of the hot air supply unit 54 is lower than the housing body 10, the hot air 70 flows to the entrance 14 through the lower end of the housing body 10.

Since the hot air 70 flowing through the entrance 14 is hotter than the surrounding air, it moves upward (e.g., by convection). Therefore, the hot air 70 flowing towards the entrance 14 by inertia when discharged from the convection heater unit 300 flows toward the uppermost end or surface of the housing body 10 due to convection (e.g., natural movement upward), and heats the cooking object(s) 60.

The hot air 70 that does not flow upward through the entrance 14, but flows upward obliquely from the underside of the cooking container 1, comes into contact with the rounded surface of the housing inside section 16 and then flows upward toward the entrance 14. Accordingly, most of the hot air 70 supplied to the lower end or underside of the housing body 10 flows upward through the entrance 14.

When the height of the holes at the upper end of the lower introduction hole section 162 is the same as or lower than the height of the uppermost end or surface of the housing body 10, a downward flow of the hot air 70 is guided along the curved surface of the side of the housing body 10.

In other words, a portion of the hot air 70 that flows horizontally through the lower introduction hole section 162 flows to the entrance 14 through the lower end or underside of the housing body 10, and the remaining portion of the hot air 70 flows to the lowermost end or surface of the housing side section 12 along the curved surface of the housing side section 12 and joins to the hot air 70 that enters the entrance 14 from the lowermost end or surface of the housing side section 12.

The housing body 10 may comprise a steel or aluminum body (which may be integrated or a single piece), with an optional coating of a low-stick or non-stick material such as Teflon or polycarbonate thereon. Stainless steel may also be used for the housing body 10, optionally without a coating thereon.

If radiation heat and/or convection heat from an upper heater unit 700 is transferred to the inside of the housing body 10, since the radiation heat and/or convection heat reflected inside the housing body 10 moves toward the uppermost end or surface of the housing body 10, thermal efficiency may be improved.

Since the housing side section 12, the housing bottom section 15 and the housing inside section 16 may have a substantially U-shaped cross-section or a substantially J-shaped cross-section, an easy upward reflection of the heat from the upper heater unit 700 may be ensured, radiation heat directed downward from a higher position may be reflected toward the uppermost end or surface of the housing body 10.

FIGS. 8 and 9 show a variation of the housing body 10, in which separate guide projections 18 may be on the housing inside section 16 to guide the rotational movement of the hot air 70.

The guide projections 18, which may have a spiral or curved shape on the surface of the housing inside section 16 facing the introduction space 17, perform a guiding function, and the hot air 70 flowing toward the entrance 14 through the introduction space 17 may rotate as a result.

A plurality of guide projections 18 along the circumference of the housing inside section 16 in the introduction space 17 may extend upward from the lowermost end or surface of the housing inside section 16.

Since the guide projections 18, which project inward from the surface of the housing inside section 16, are each inclined and/or curved in the same direction, the hot air 70 passing through the housing inside section 16 is guided by the guide projections 18 and forms a vortex flow.

As the hot air 70 forming the vortex flow moves to the support unit 30 through the housing body 10, the time and area by and over which the cooking object(s) 60 on the support unit 30 and the hot air 70 come into contact with each other increase, and the cooking time may be reduced or shortened.

Referring to FIGS. 2 to 5, the support unit 30 on the housing unit 5 may have any of a variety of shapes without departing from the technical concept that it includes a plurality of through-holes and supports the cooking object(s) 60 to be cooked by the hot air 70.

The support unit 30 in accordance with various embodiment(s) includes a support body section 31 and a cover section 39.

The support body section 31 may have any of a variety of shapes without departing from the technical concept that it includes the plurality of through-holes through which the hot air 70 flows, and the cover section 39 may have any of a variety of shapes without departing from the technical concept that it covers the outer periphery of the support body section 31.

The support body section 31 in accordance with various embodiment(s) includes a peripheral support part 32, a central support part 33, a plurality of first support parts 34, and a plurality of second support parts 36.

The peripheral support part 32 may have an annular shape. The cover section 39 covers the peripheral support part 32. The central support part 33, the first support parts 34 and the second support parts 36 are generally inside the peripheral support part 32.

The peripheral support part 32 covered by the cover section 39 may have a ring or annular shape, and may comprise or consist essentially of aluminum.

The central support part 33 is at the center portion of the support body section 31, inside the peripheral support part 32. The central support part 33 and the peripheral support part 32 are separate from each other.

The first support parts 34 and the second support parts 36 which extend from the central support part 33 are connected to the peripheral support part 32. Since the first support parts 34 and the second support parts 36 may be curved and/or have a spiral shape, they may guide the rotation of the hot air 70 which flows from the lowermost end or surface of the support unit 30 toward the uppermost end or surface of the support unit 30.

The first support parts 34 have first through-holes 35 through which the hot air 70 passes. The first support parts 34 extend from the central support part 33 to the peripheral support part 32, and may have a curved or spiral shape. The first through-holes 35 may have an oval or curved oval (e.g., "kidney") shape.

A plurality of first support parts 34 are along the circumference of the central support part 33, and the second support parts 36 are between adjacent first support parts 34.

The second support parts 36 have second through-holes 37 through which the hot air 70 passes, and extend like the first support parts 34. The second support parts 36 may have a curved or spiral shape. The second through-holes 37 may have an oval or curved oval (e.g., "kidney") shape.

The second support parts 36 may have a width that is at least two times wider than the width of the first support parts 34. Cooking of the cooking object(s) 60 is mainly carried out by and/or on the second support parts 36.

Since the uppermost surface of the second support parts 36 is below the first support parts 34, the hot air 70 moving from the lowermost end or surface of the support unit 30 toward the uppermost end or surface of the support unit 30 rotates along the lower surfaces of the first support parts 34 and forms a vortex flow.

Because the direction of the vortex flow formed as the hot air 70 passes the guide projections 18 of the housing unit 5 is the same as the vortex flow formed as the hot air 70 moves along the lower surfaces of the first support parts 34, the hot air 70 forms a vortex flow inside the housing unit 5, and the contact time of the hot air 70 with the cooking object(s) 60 increases.

The first through-holes 35 in the first support parts 34 and the second through-holes 37 in the second support parts 36 extend in a circumferential direction.

The first through-holes 35 and the second through-holes 37 may form arcs centered on the central support part 33. A plurality of first through-holes 35 and a plurality of second through-holes 37 are between the central support part 33 and the peripheral support part 32.

The second support parts 36 include rounded support portions 38 having an arc-like shape and a convex upward cross-section, although the second support parts 36 are not limited to such a configuration. The arc(s) of the second support parts 36 are generally centered on the central support part 33.

The rounded support portions 38 may have an upwardly convex shape, and the lowermost surface of the rounded support portions 38 may be concave. Thus, juice or other liquid(s) coming out from the cooking object(s) 60 on the rounded support portions 38 flows downward on the rounded support portions 38 and optionally into the body 10. As a result, cleaning the surface(s) of the second support parts 36 may be relatively easy or convenient to perform.

Further, since the hot air 70 supplied to the lower portions of the rounded support portions 38 may stay in the concave grooves of the rounded support portions 38, the contact time of the hot air 70 with the rounded support portions 38 increases, and heating the rounded support portions 38 may be easily implemented, whereby the cooking time for the cooking object(s) 60 may be reduced or shortened.

The cover section 39 covering the peripheral support part 32 may comprise rubber and/or silicon. Thus, it is possible to prevent sparks from occurring at the periphery of the support unit 30 while the support unit 30 is placed in a microwave oven.

The support unit 30 in accordance with one or more embodiment(s) may comprise aluminum coated with Teflon or other low-stick or non-stick material.

Since aluminum has high heat conductivity, heating the cooking object(s) 60 may be quickly implemented, and the coating may prevent adhesion of the cooking object(s) 60 to the support unit 30.

Since the cover section 39 may include silicone, it is generally between the support unit 30 (which may comprise aluminum) and the housing body 10 (which may comprise a steel plate), and can prevent the occurrence of a spark.

Referring to FIGS. 2 and 6, each of the legs 40 includes a leg frame 42 fixed to the outer surface of the housing unit 5, and a leg cover 45 which surrounds and receives the leg frame 42. The leg frame 42 may comprise a shaped wire.

The leg frame 42 may comprise a steel structure, and the leg cover 45 surrounding and receiving the leg frame 42 may comprise silicone.

The leg frame 42 in accordance with one or more embodiment(s) includes a fixing part 43 fixed to the lower portion of the housing unit 5, and extending parts 44 which extend downward from ends of the fixing part 43.

Since the leg cover 45 is coupled to the extending parts 44 which outwardly slope and extend downward from the lower portion of the housing unit 5, the leg cover 45 is fixed to the outer surfaces of the extending parts 44.

The leg cover 45 in accordance with one or more embodiment(s) of the present disclosure includes a cover body 46 which has mounting grooves or holes 47 into which the extending parts 44 are inserted, and a shielding part 48 comprising a groove in the cover body 46 configured to shield the fixing part 43.

The mounting grooves or holes 47 extend into the cover body 46, and the shielding part 48 which may at least partially conform to the contour of the fixing part 43 is in one end of the cover body 46.

Because the extending parts 44 are inserted into the mounting grooves or holes 47, and the fixing part 43 is received in the shielding part 48, the leg frame 42 is shielded by the leg cover 45, by which the occurrence of a spark may be prevented.

Referring to FIGS. 2 and 7, since the cooking container 1 for an electronic oven is rotated by the tray of the electronic oven 50, it is possible to uniformly heat the cooking object(s) 60.

The electronic oven 50 includes an upper heating unit 52 and the hot air supply unit 54. Radiation and/or heat is supplied from the upper heater unit 52, and the hot air 70 is supplied from the hot air supply unit 54.

The cooking container 1 for an electronic oven is placed on the tray of the electronic oven 50. The upper heater unit 52 is installed above the cooking container 1 (e.g., above an upper or ceiling panel of the electronic oven), and the hot air supply unit 54 is installed behind the cooking container 1 (e.g., behind a rear wall or panel of the electronic oven).

The hot air produced from the upper heater unit 52 is supplied to the upper part of the cooking container 1, and the hot air 70 produced from the hot air supply unit 54 moves to the lower end of the cooking container 1 and enters inside the housing unit 5.

The electronic oven 50 in accordance with various embodiments may comprise a convection microwave oven, having the upper heater unit 52 and the hot air supply unit 54 in combination.

Hereinafter, operations of the cooking container 1 and/or electronic oven in accordance with embodiment(s) of the present disclosure will be described in detail.

After placing the cooking container 1 inside the electronic oven 50, the upper heater unit 700 and/or the hot air supply unit 54 are operated (e.g., turned on).

The upper heater unit 52 is operated through actuation of a heater including heating lines (e.g., linear resistance heaters) in the upper heater unit 52. As a result, radiation and/or heat is transferred toward the support unit 30 (e.g., in the downward direction).

The radiation heat that moves below the support unit 30 after heating the cooking object(s) 60 may be reflected inside the housing body 10 and move back upwards.

Since the hot air reflected by the housing body 10 is transferred to the lowermost end or surface of the support unit 30 and may provide secondary heat to the cooking object(s) 60, the cooking time may be reduced or shortened.

The hot air 70 produced from the hot air supply unit 54 moves to the side of the housing body 10 or the lower end or underside of the housing body 10.

The hot air 70 guided to the lower end or underside of the housing body 10 on the housing side section 12 flows to the introduction space 17 in the housing inside section 16.

The hot air 70 that moves upward through the housing inside section 16 rotates and/or is guided by the guide projections 18 in the housing inside section 16, and may create a vortex flow.

Since the hot air 70 entering the housing body 10 creates the vortex flow while rotating on and/or contacting the lower surfaces of the first support parts 34 in the support unit 30, the contact time of the support body section 31 and the cooking object(s) 60 with the hot air 70 increases, whereby thermal efficiency may improve and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 and the support body section 31 may increase, by which heating of the support body section 31 may be easily implemented.

Hereafter, a cooking container for a cooking apparatus in accordance with one or more further embodiments of the present disclosure will be described with reference to drawings.

For the sake of convenience in explanations, the same reference numerals will be used to refer to components and/or elements with the same construction(s) and/or function(s) as other embodiment(s) of the present disclosure, and detailed descriptions thereof will be omitted.

Figure 10:
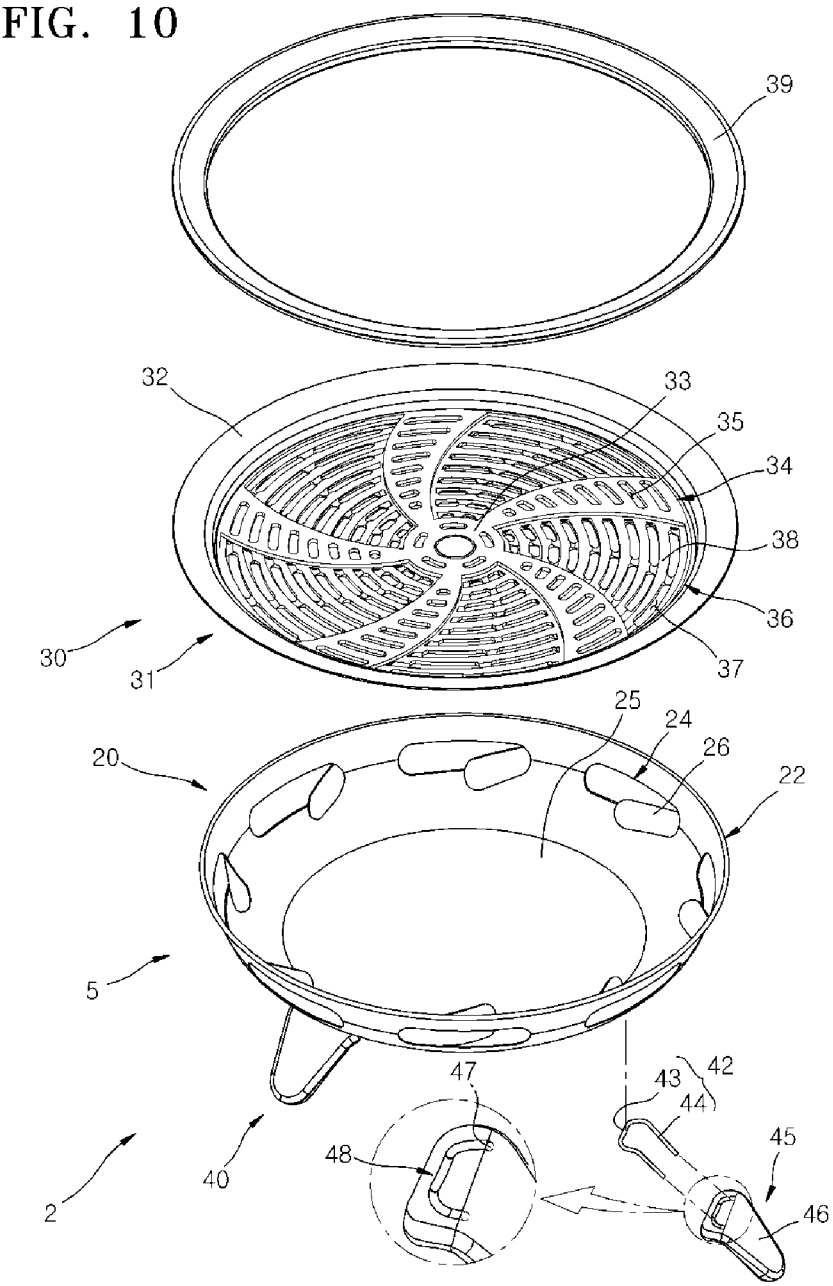
FIG. 10 is an exploded perspective view schematically illustrating an exemplary cooking container for an electronic oven in accordance with one or more embodiments of the present disclosure.
Figure 11:
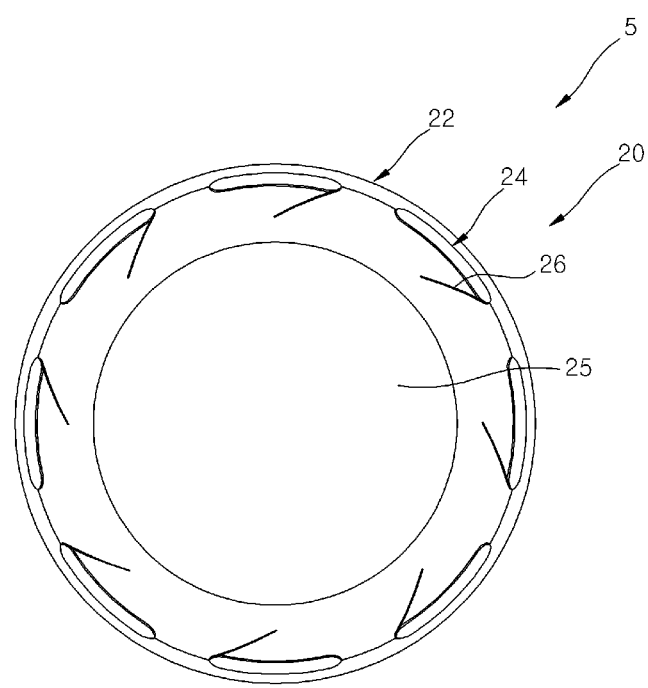
FIG. 11 is a plan view schematically illustrating exemplary inner guides inside a housing body in the exemplary cooking container for an electronic oven in accordance with embodiment(s) of the present disclosure.
Figure 12:
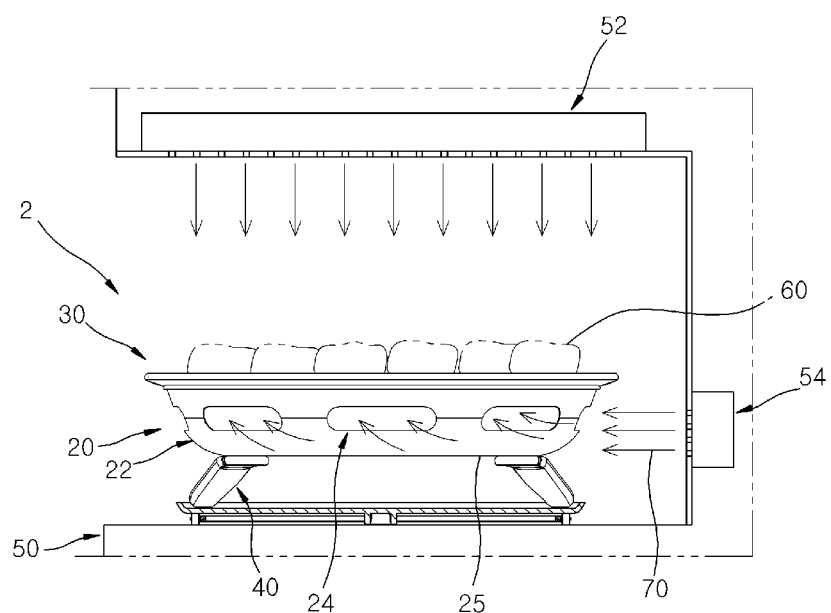
FIG. 12 is a view schematically illustrating the exemplary cooking container in accordance with embodiment(s) of the present disclosure in an electronic oven during frying.

FIG. 10 is an exploded perspective view schematically illustrating an exemplary cooking container for an electronic oven in accordance with one or more embodiments of the present disclosure, FIG. 11 is a plan view schematically illustrating exemplary inner guides inside a housing body in the exemplary cooking container for an electronic oven in accordance with embodiment(s) of the present disclosure, and FIG. 12 is a view schematically illustrating the exemplary cooking container in accordance with embodiment(s) of the present disclosure in an electronic oven during frying.

Referring to FIGS. 10 to 12, the housing unit 5 in accordance with one or more other embodiments includes a housing body 20 and legs 40.

Entrances 24 configured to supply hot air 70 to the inside of the housing body 20 are along the side surface of the housing body 20. The uppermost end or surface of the housing body 20 is open, and the lower end or underside of the housing body 20 is supported by the legs 40.

The housing body 20 in accordance with one or more embodiment(s) of the present disclosure includes a housing side section 22, a housing bottom section 25, and inner guides 26.

The housing side section 22 forms an outside surface of the housing body 20 and supports the periphery of the support unit 30. The housing side section 22 may have a ring or annular shape which extends downward.

The entrances 24 along the circumference of the housing side section 22 form passages through which the hot air 70 moves to the inside of the housing body 20.

The entrances 24 may comprise slots or openings which extend horizontally. A plurality of entrances 24 are along the housing side section 22.

The housing bottom section 25 is secured to or integral with the lowermost end or surface of the housing side section 22 forms the bottom of the housing body 20.

Since the upper ends or uppermost boundaries of the entrances 24 have the same height as or a lower height than the height of the upper end of the hot air supply unit 54 from which the hot air 70 is discharged towards the side of the housing body 20, the hot air 70 may easily enter the entrances 24.

A portion of the hot air 70 from the hot air supply unit 54 moves to the inside of the housing body 20 through the entrances 24 in the side surface of the housing side section 22, and the hot air 70 above the entrances 24 flows downwardly along the curved or sloped surface of the housing side section 22 and enters the entrances 24. As a consequence, the heating time of the cooking object(s) 60 by the hot air 70 may be reduced or shortened.

The inner guides 26 are connected to the inner surface of the housing side section 22, and project into the housing side section 22. The inner guides 26 may have any of a variety of shapes without departing from the technical concept that they guide the movement of the hot air 70 that enters the entrances 24.

The inner guides 26 in accordance with one or more embodiment(s) of the present disclosure project toward the inside of the housing side section 22 from one end of the entrance 24 in a horizontal direction and/or at an angle facilitating formation of a vortex flow of the hot air 70 inside the housing body 20.

The hot air 70 entering the entrances 24 is guided by the inner guides 26 and forms a vortex flow. As a result, the contact area and contact time of the hot air 70 and the cooking object(s) 60 with each other increase.

Hereinafter, operations of the cooking container 2 for an electronic oven in accordance with one or more embodiments of the present disclosure will be described in detail.

The hot air 70 produced from the hot air supply unit 54 is moves toward the side of the housing body 20, and along the rounded surface of the housing side section 22, then inside the housing body 20 through the entrances 24.

The hot air 70 in the housing body 20 rotates inside the housing body 20, and its movement is guided by the inner guides 26.

Since the hot air 70 creates a vortex that flows inside of the housing body 20 and rotates on the surfaces of the first support parts 34 in the support unit 30, the contact time of the support body section 31 and the cooking object(s) 60 with the hot air 70 increases, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 stays for at least some time in the concave grooves of the rounded support portions 38 in the second support parts 36, the contact time of the hot air 70 with the support body section 31 increases, by which heating of the support body section 31 may be easily implemented.

The radiation and/or heat generated by the upper heater unit 52 heats the cooking object(s) 60 in the same manner as in other embodiments.

Hereinafter, a cooking container for a cooking apparatus in accordance with one or more further embodiments of the present disclosure will be described with reference to the drawings.

For the sake of convenience in explanations, the same reference numerals will be used to refer to component elements with the same constructions and functions as other embodiment(s) of the present disclosure, and detailed descriptions thereof will be omitted.

Figure 13:
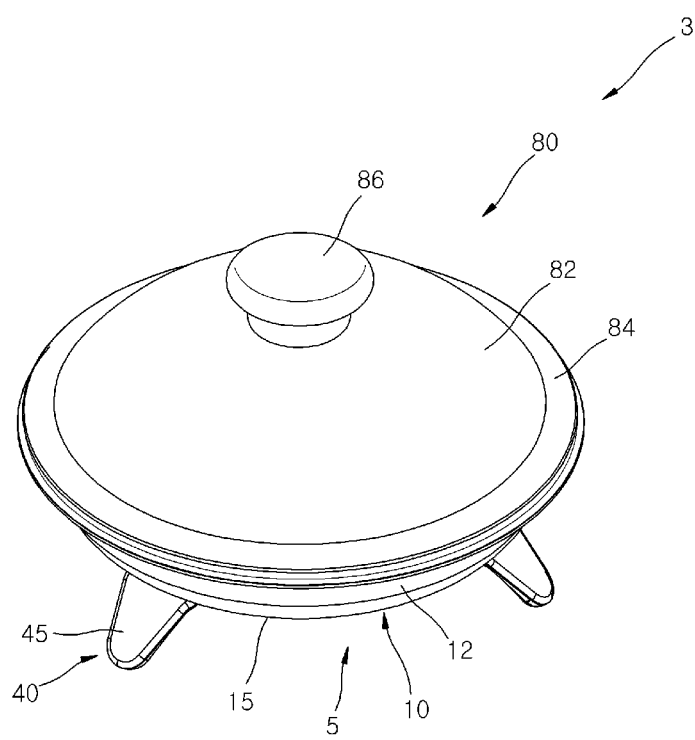
FIG. 13 is a perspective view schematically illustrating an exemplary cooking container for an electronic oven in accordance with one or more embodiments of the present disclosure.
Figure 14:
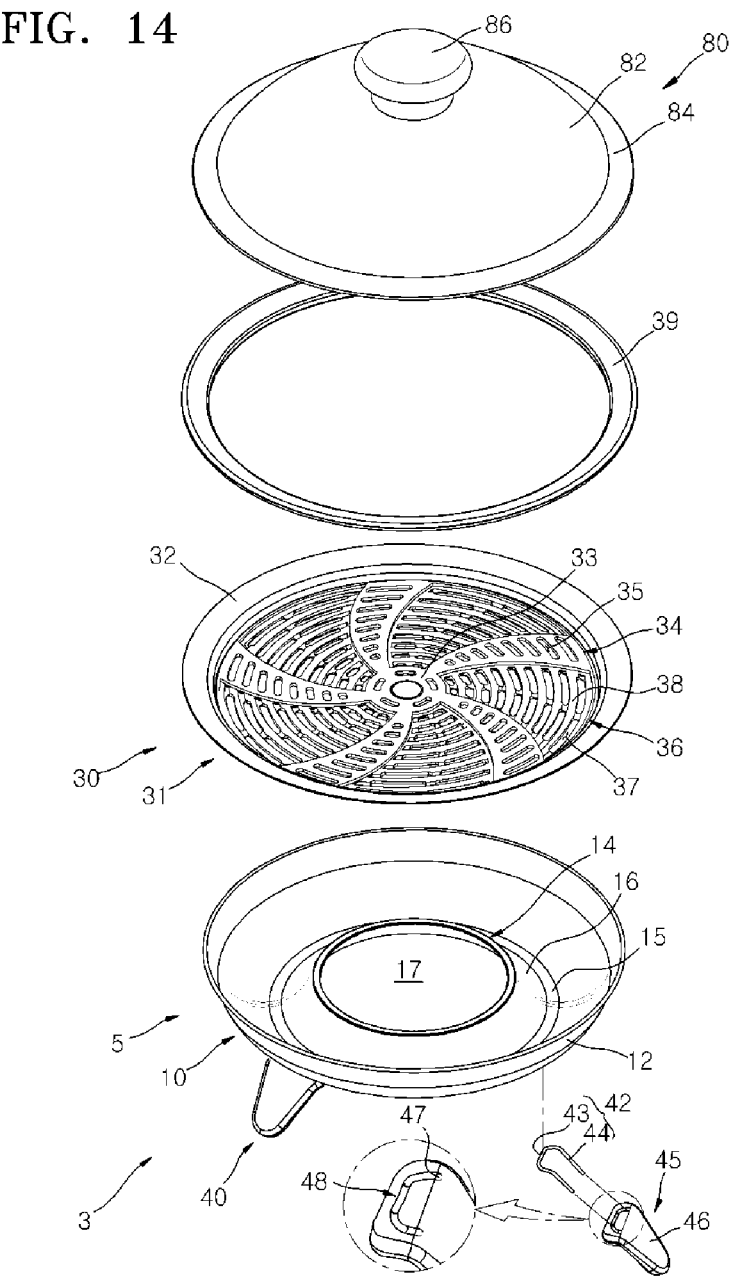
FIG. 14 is an exploded perspective view schematically illustrating the exemplary cooking container for an electronic oven in accordance with embodiment(s) of the present disclosure.
Figure 15:
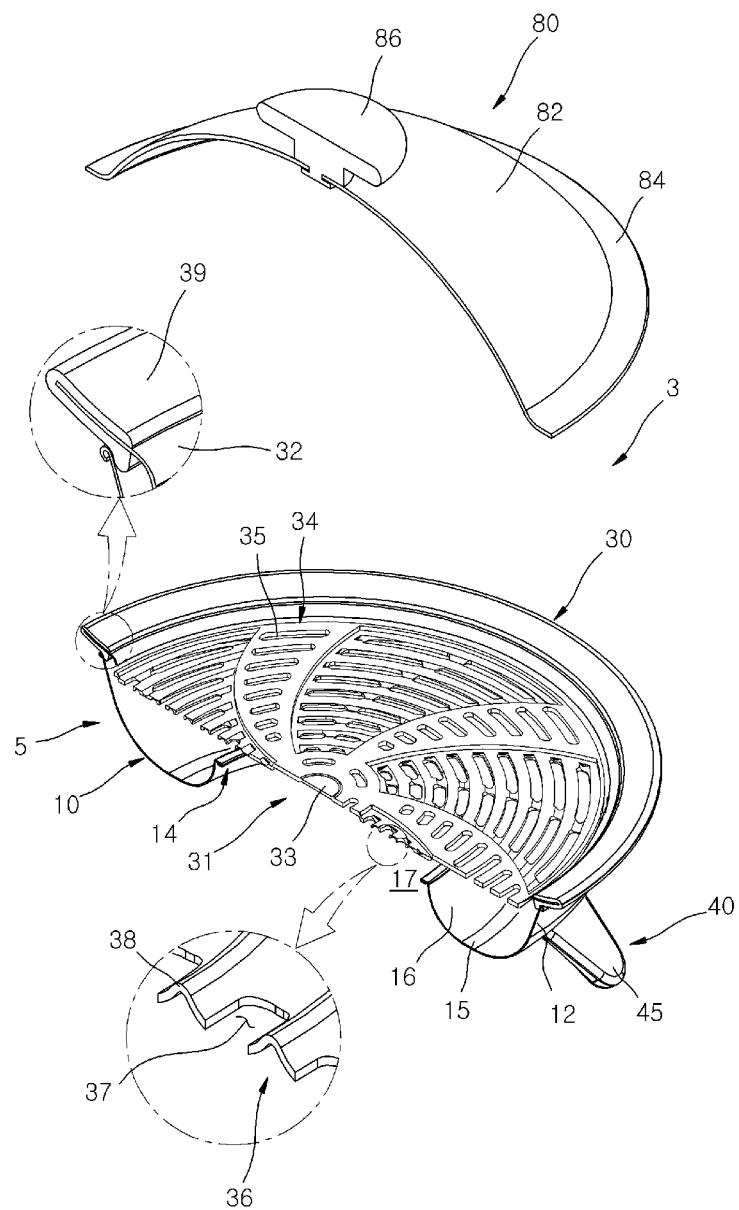
FIG. 15 is a cut-away perspective view schematically illustrating the exemplary cooking container for an electronic oven in accordance with embodiment(s) of the present disclosure.
Figure 16:
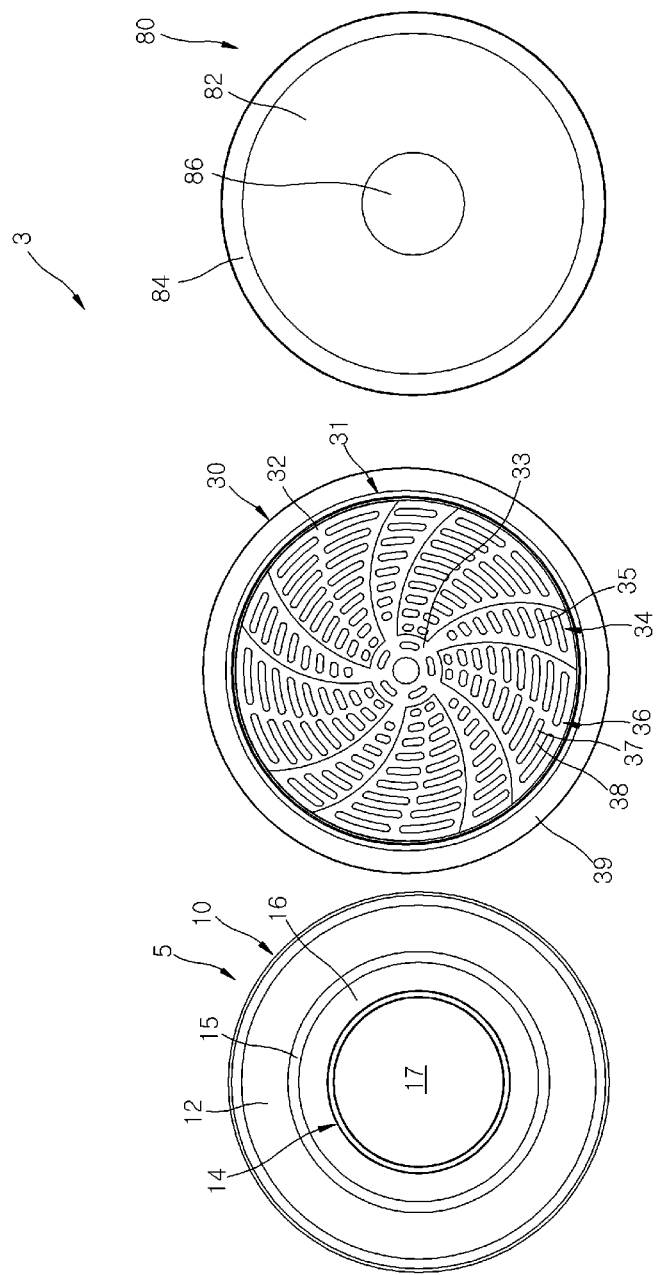
FIG. 16 is a plan view illustrating an exploded housing body, support unit and cover unit in the exemplary cooking container for an electronic oven in accordance with embodiment(s) of the present disclosure.
Figure 17:
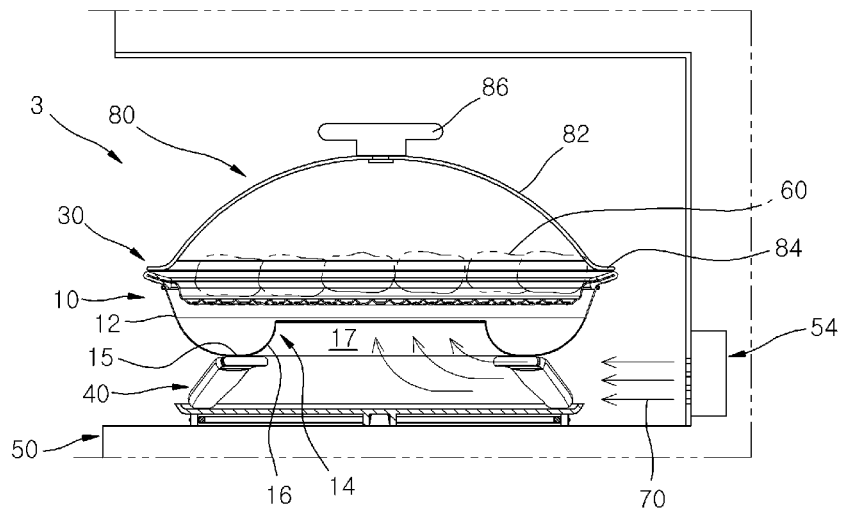
FIG. 17 is a view schematically illustrating the exemplary cooking container in an electronic oven in accordance with embodiment(s) of the present disclosure during frying.
Figure 18:
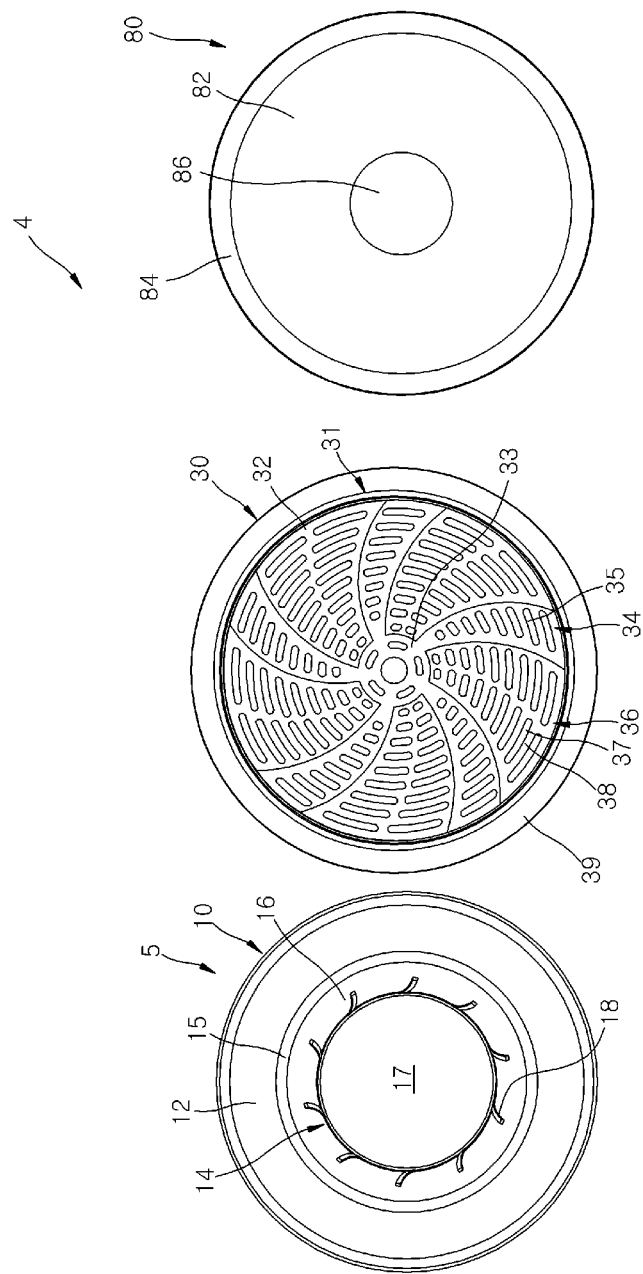
FIG. 18 is a plan view illustrating a variation of the housing body in the exemplary cooking container for an electronic oven in accordance with embodiment(s) of the present disclosure.

FIG. 13 is a perspective view schematically illustrating an exemplary cooking container for an electronic oven in accordance with one or more embodiments of the present disclosure, FIG. 14 is an exploded perspective view schematically illustrating the exemplary cooking container for an electronic oven in accordance with embodiment(s) of the present disclosure, FIG. 15 is a cut-away perspective view schematically illustrating the exemplary cooking container for an electronic oven in accordance with embodiment(s) of the present disclosure, FIG. 16 is a plan view illustrating an exploded housing body, support unit and cover unit in the exemplary cooking container for an electronic oven in accordance with embodiment(s) of the present disclosure, FIG. 17 is a view schematically illustrating the exemplary cooking container in an electronic oven in accordance with embodiment(s) of the present disclosure during frying, and FIG. 18 is a plan view illustrating a variation of the housing body in the exemplary cooking container for an electronic oven in accordance with embodiment(s) of the present disclosure.

Referring to FIGS. 13, 14 and 17, the cooking container 3 for an electronic oven in accordance with one or more embodiments of the present disclosure includes a housing unit 5 which has an entrance 14 through which hot air 70 enters, a support unit 30 on the housing unit 5 and on which one or more cooking objects 60 to be cooked by the hot air 70 is placed, and a cover 80 that covers the support unit 30 and blocks the movement of the hot air 70.

The cooking object(s) 60 are placed on the support unit 30, and the housing unit 5 is under the support unit 30. Since the housing unit 5 supports the support unit 30 and has an entrance 14, hot air 70 may enter the housing unit 5 through the entrance 14.

The housing unit 5 may have one or more of a variety of shapes without departing from a technical concept that it defines air flow paths for the hot air 70 supplied through the entrance 14 to heat the cooking object(s) 60 on the support unit 30.

Referring to FIGS. 14 to 17, the housing unit 5 in accordance with various embodiments includes a housing body 10 with the entrance 14 at a lower portion thereof and open at the upper end thereof, and legs 40 which support the housing body 10.

The legs 40 extend downward from the housing body 10, and are placed on a turntable or a bottom surface or portion of the electronic oven 50.

The entrance 14 is at the lower portion of the housing body 10, and the hot air 70 supplied to or along a side of the cooking container 1 for an electronic oven enters the lower portion of the housing body 10 and flows toward the upper portion of the housing body 10.

A space is under the housing body 10 is due to the fact that the housing body 10 is supported by the legs 40. As a result, the flow of air moving to the inside of the housing body 10 through the lower portion of the housing body 10 may be smoothly implemented.

The housing body 10 includes a housing side section 12, the entrance 14, a housing bottom section 15, a housing inside section 16, an introduction space 17, and optional guide projections 18.

The housing side section 12 supports the periphery of the support unit 30 and has a shape which extends downward.

When viewed from the top, the housing side section 12 which forms the side surface of the housing body 10 has a circular or ring shape, and when viewed from the side, has a rounded contour or curved cross-section, which may be rounded from the uppermost end or surface to the lowermost end or surface of the housing side section 12.

Since the housing side section 12 has a rounded contour and curves inwardly towards the housing body 10 in a downward direction, the hot air 70 flowing from the side of the housing body 10 toward the housing side section 12 may be guided downward towards the underside of the housing side section 12, whereby the cooking time may be reduced or shortened.

That is, since the housing side section 12 is sloped and/or has a rounded shape, the hot air 70 supplied in a sideward direction towards the housing body 10 may be easily introduced into the housing body 10 through the entrance 14 at a lower portion or underside of the housing body 10, the amount of hot air 70 flowing into the entrance 14 may be increased, by which loss of hot air 70 may be reduced.

The housing bottom section 15 connected to and/or integral with the lowermost end or surface of the housing side section 12 extends inwardly from the lowermost end or surface of the housing side section 12.

The housing bottom section 15 extends horizontally from the lowermost end or surface of the housing side section 12 and has an annular shape. The leg sections 40 are fixed to the lowermost surface of the housing bottom section 15.

Since the leg sections 40 are abutted on the housing bottom section 15 which extends horizontally, the contact area between the leg sections 40 and the housing bottom section 15 may be increased or maximized, by which fixing or securing the leg sections 40 to the housing body 10 may be stably implemented.

The housing inside section 16 which extends upward from the housing bottom section 15 defines, at the uppermost end or surface thereof, the entrance 14 through which the hot air 70 enters the cooking container 1.

The introduction space 17 which communicates with the entrance 14 is in the housing inside section 16. The housing inside section 16 which defines the introduction space 17 has a convex curved shape.

Because the introduction space 17 is under the entrance 14, and the housing inside section 16 defining the introduction space 17 has a convex curved shape, the flow of hot air 70 through the housing inside section 16 to the entrance 14 may be stably implemented.

Since the housing inside section 16 may have a funnel shape (or inverse funnel shape) which decreases with distance from the surface on which the cooking container 1 is placed, the hot air 70 which flows upward through the housing inside section 16 may smoothly enter the housing body 10 through the entrance 14.

The uppermost end or surface of the housing body 10 in accordance with various embodiments is at a position and/or height (e.g., a distance from the bottom wall 120 of the cooking chamber C) the same as or higher than a hot air supply unit 54 through which the hot air 70 is discharged toward the side of the housing body 10. As a result, the hot air 70 may be easily supplied into the housing body 10 through the lower end or underside of the housing body 10.

A hot air supply unit 54 having a plurality of holes through which the hot air 70 is discharged is installed at a lower part of the electronic oven 50 (e.g., behind a rear wall or panel).

The holes of the hot air supply unit 54 communicate with the interior or inside of the electronic oven 50. Such holes may form a plurality of rows and/or be in a horizontal direction at a lower part of the inside of the electronic oven 50 (e.g., along a bottom half of the rear wall or panel of the electronic oven 50, which may be a convection oven, a microwave oven, or a combination thereof).

The height of the holes at the upper end of the hot air supply unit 54 may be the same as or lower than the height of the upper end of the housing body 10.

In the case where the height of the hot air supply unit 54 is lower than the housing body 10, the hot air 70 flows to the entrance 14 through the lower end of the housing body 10.

Since the hot air 70 flowing through the entrance 14 is hotter than the surrounding air, it moves upward (e.g., by convection). Therefore, the hot air 70 flowing towards the entrance 14 by inertia when discharged a convection heater unit 300 and/or the hot air supply unit 54 flows toward the uppermost end or surface of the housing body 10 due to convection (e.g., natural movement upward), and heats the cooking object(s) 60.

The hot air 70 that does not flow upward through the entrance 14, but flows upward obliquely from the underside of the cooking container 1, comes into contact with the rounded surface of the housing inside section 16 and then flows upward toward the entrance 14. Accordingly, most of the hot air 70 supplied to the lower end or underside of the housing body 10 flows upward through the entrance 14.

The housing body 10 may comprise a steel or aluminum body (which may be integrated or a single piece), with an optional coating of a low-stick or non-stick material such as Teflon or polycarbonate thereon. Stainless steel may also be used for the housing body 10, optionally without a coating thereon.

Since the housing side section 12, the housing bottom section 15 and the housing inside section 16 have a substantially U-shaped or J-shaped cross-section, radiation and/or heat directed downward from an upper position may be reflected toward the upper end of the housing body 10. Rotation of the hot air 70 that moves upward while rotating inside the housing body 10 may be guided, as disclosed herein.

Referring to FIG. 18, which shows a variation of the housing body 10, separate guide projections (or guides) 18 may be on the housing inside section 16 and guide the rotational movement of the hot air 70.

The guide projections 18, which may have a spiral or curved shape on the surface of the housing inside section 16 facing the introduction space 17, perform a guiding function, and the hot air 70 flowing toward the entrance 14 through the introduction space 17 may rotate as a result.

A plurality of guide projections 18 along the circumference of the housing inside section 16 in the introduction space 17 may extend upward from the lowermost end or surface of the housing inside section 16.

Since the guide projections 18, which project inward from the surface of the housing inside section 16, are each inclined and/or curved in the same direction, the hot air 70 passing through the housing inside section 16 is guided by the guide projections 18 and forms a vortex flow.

As the hot air 70 forming the vortex flow moves to the support unit 30 through the housing body 10, the time and area by and over which the cooking object(s) 60 on the support unit 30 and the hot air 70 come into contact with each other increase, and the cooking time may be reduced or shortened.

Referring to FIGS. 13 to 16, the support unit 30 on the housing unit 5 may have any of a variety of shapes without departing from the technical concept that it includes a plurality of through-holes and supports the cooking object(s) 60 to be cooked by the hot air 70.

The support unit 30 in accordance with various embodiment(s) includes a support body section 31 and a cover section 39.

The support body section 31 may have any of a variety of shapes without departing from the technical concept that it includes the plurality of through-holes through which the hot air 70 flows, and the cover section 39 may have any of a variety of shapes without departing from the technical concept that it covers the outer periphery of the support body section 31.

The support body section 31 in accordance with various embodiments includes a peripheral support part 32, a central support part 33, a plurality of first support parts 34, and a plurality of second support parts 36.

The peripheral support part 32 may have an annular shape. The cover section 39 covers the peripheral support part 32. The central support part 33, the first support parts 34 and the second support parts 36 are generally inside the peripheral support part 32.

The peripheral support part 32 covered by the cover section 39 may have a ring or annular shape, and may comprise or consist essentially of aluminum.

The central support part 33 is at the center portion of the support body section 31, inside the peripheral support part 32. The central support part 33 and the peripheral support part 32 are separate from each other.

The first support parts 34 and the second support parts 36 which extend from the central support part 33 are connected to the peripheral support part 32. Since the first support parts 34 and the second support parts 36 may be curved and/or have a spiral shape, they may guide the rotation of the hot air 70 which flows from the lowermost end or surface of the support unit 30 toward the uppermost end or surface of the support unit 30.

The first support parts 34 have first through-holes 35 through which the hot air 70 passes. The first support parts 34 extend from the central support part 33 to the peripheral support part 32, and may have a curved or spiral shape. The first through-holes 35 may have an oval or curved oval (e.g., "kidney") shape.

A plurality of first support parts 34 are along the circumference of the central support part 33, and the second support parts 36 are between adjacent first support parts 34.

The second support parts 36 have second through-holes 37 through which the hot air 70 passes, and extend like the first support parts 34. The second support parts 36 may have a curved or spiral shape. The second through-holes 37 may have an oval or curved oval (e.g., "kidney") shape.

The second support parts 36 may have a width that is at least two times the width of the first support parts 34. Cooking the cooking object(s) 60 is mainly carried out by and/or on the second support parts 36.

Since the uppermost surface of the second support parts 36 is below the first support parts 34, the hot air 70 moving from the lowermost end or surface of the support unit 30 toward the uppermost end or surface of the support unit 30 rotates along the lower surfaces of the first support parts 34 and forms a vortex flow.

Because the direction of the vortex flow formed as the hot air 70 passes the guide projections 18 of the housing unit 5 is the same as the vortex flow formed as the hot air 70 moves along the lower surfaces of the first support parts 34, the hot air 70 forms a vortex flow inside the housing unit 5, and the contact time of the hot air 70 with the cooking object(s) 60 increases.

The first through-holes 35 in the first support parts 34 and the second through-holes 37 in the second support parts 36 extend in a circumferential direction.

The first through-holes 35 and the second through-holes 37 may form arcs centered on the central support part 33. A plurality of first through-holes 35 and a plurality of second through-holes 37 are between the central support part 33 and the peripheral support part 32.

The second support parts 36 include rounded support portions 38 having an arc-like shape and a convex upward cross-section, although the second support parts 36 are not limited to such a configuration. The arc(s) of the second support parts 36 are generally centered on the central support part 33.

The rounded support portions 38 may have an upwardly convex shape, and the lowermost surface of the rounded support portions 38 may be concave. Thus, juice or other liquid(s) coming out from the cooking object(s) 60 on the rounded support portions 38 flows downward on the rounded support portions 38 and optionally into the body 10. As a result, cleaning the surface(s) of the second support parts 36 may be relatively easy or convenient to perform.

Further, since the hot air 70 supplied to the lower portions of the rounded support portions 38 may stay in the concave grooves of the rounded support portions 38, the contact time of the hot air 70 with the rounded support portions 38 increases, and heating the rounded support portions 38 may be easily implemented, whereby the cooking time for the cooking object(s) 60 may be reduced or shortened.

The cover section 39 covering the peripheral support part 32 may comprise rubber and/or silicon. Thus, it is possible to prevent sparks from occurring at the periphery of the support unit 30 while the support unit 30 is placed in a microwave oven.

The support unit 30 in accordance with one or more embodiment(s) may comprise aluminum coated with Teflon or other low-stick or non-stick material.

Since aluminum has high heat conductivity, heating the cooking object(s) 60 may be quickly implemented, and the coating may prevent adhesion of the cooking object(s) 60 to the support unit 30.

Since the cover section 39 may include silicone, it is generally between the support unit 30 (which may comprise aluminum) and the housing body 10 (which may comprise a steel plate), and can prevent the occurrence of a spark.

Referring to FIG. 14, each of the legs 40 includes a leg frame 42 (which may comprise a shaped wire) fixed to the outer surface of the housing unit 5, and a leg cover 45 configured to surround and/or receive the leg frame 42.

The leg frame 42 may comprise a steel structure, and the leg cover 45 surrounding and receiving the leg frame 42 may comprise silicone.

The leg frame 42 in accordance with one or more embodiment(s) includes a fixing part 43 fixed to the lower portion of the housing unit 5, and extending parts 44 which extend downward from ends of the fixing part 43.

Since the leg cover 45 is coupled to the extending parts 44 which outwardly slope and extend downward from the lower portion of the housing unit 5, the leg cover 45 is fixed to the outer surfaces of the extending parts 44.

Referring to FIGS. 14 and 17, the cooking container 1 for an electronic oven is rotated by the tray of the electronic oven 50. Thus, it is possible to uniformly heat the cooking object(s) 60.

The electronic oven 50 includes a hot air supply unit 54 for supplying the hot air 70.

The cooking container 3 is placed on the tray of the electronic oven 50, and the hot air supply unit 54 is disposed behind the cooking container 3 and/or behind a rear wall or panel of the electronic oven 50.

The hot air 70 produced from the hot air supply unit 54 moves to the lower end of the cooking container 3 and enters inside of the housing unit 5.

The electronic oven 50 in accordance with various embodiments may comprise a convection microwave oven having the hot air supply unit 54.

The cover unit 80 which covers the upper part of the support unit 30 may have one or more of a variety of shapes without departing from a technical concept that it blocks the movement of the hot air 70 that might otherwise move upward from the support unit 30.

The cover unit 80 according to embodiment(s) includes a cover body section 82 that closes the upper end of the support unit 30, and a knob member 86 that projects upward from the cover body section 82.

The cover body section 82 may have a dome-like or spherical cap shape. The cover body section 82 covers the support unit 30, and may restrict or restrain the movement of the hot air 70 that might otherwise move outside of the cooking container 3 for an electronic oven.

Also, since the cover body section 82 defines therein a space in which the hot air 70 may stay, the heating time for cooking the cooking object(s) 60 may be reduced or shortened.

A junction member 84 configured to be brought into contact with the periphery of the support unit 30 and that may comprise an elastic material is on the periphery of the cover body section 82. The junction member 84 facilitates effective restriction and/or restraint of the movement of the hot air 70 within the cover body section 82.

The junction member 84 may have an annular or ring shape that projects outward from the periphery of the cover body 82. The lower surface of the junction member 84 comes into contact with the cover section 39 of the support unit 30, and may improve airtightness.

Hereinafter, operations of the cooking container 3 and/or the electronic oven 50 in accordance with one or more embodiments of the present disclosure will be described in detail.

After placing the cooking container 3 inside the electronic oven 50, the hot air supply unit 54 is operated (e.g., turned on).

The hot air 70 produced from the hot air supply unit 54 moves toward the side of the housing body 10 and/or the lower end of the housing body 10.

The hot air 70 at the lower end or underside of the housing body 10 on the housing side section 12 flows to the introduction space 17 defined by the housing inside section 16.

The hot air 70 moves upward through the housing inside section 16, and at least some part is rotated by the guide projections 18 on the housing inside section 16 to create a vortex flow.

Since the hot air 70 entering the inside of the housing body 10 creates a vortex flow while rotating on the lower surfaces of the first support parts 34 in the support unit 30, the contact time of the support body section 31 and the cooking object(s) 60 with the hot air 70 is increased, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 with the support body section 31 is increased, by which heating of the support body section 31 may be easily implemented.

Meanwhile, the hot air 70 moving up from the support unit 30 after heating the cooking object(s) 60 is reflected on the inner surface of the cover unit 80, then moves back down toward the support unit 30, and secondarily heats the cooking object(s) 60, whereby the cooking time may be reduced or shortened.

Since the hot air 70 having moved upward after heating the cooking object(s) 60 stays inside the cover unit 80 and raises the temperature inside of the cover unit 80, the cooking time of the cooking object(s) 60 below the cover unit 80 may be reduced or shortened.

Hereafter, an exemplary cooking container for a cooking apparatus in accordance with one or more further embodiments of the present disclosure will be described with reference to drawings.

For the sake of convenience in explanations, the same reference numerals will be used to refer to components and/or elements with the same construction(s) and/or function(s) as other embodiments of the present disclosure, and detailed descriptions thereof will be omitted.

Figure 19:
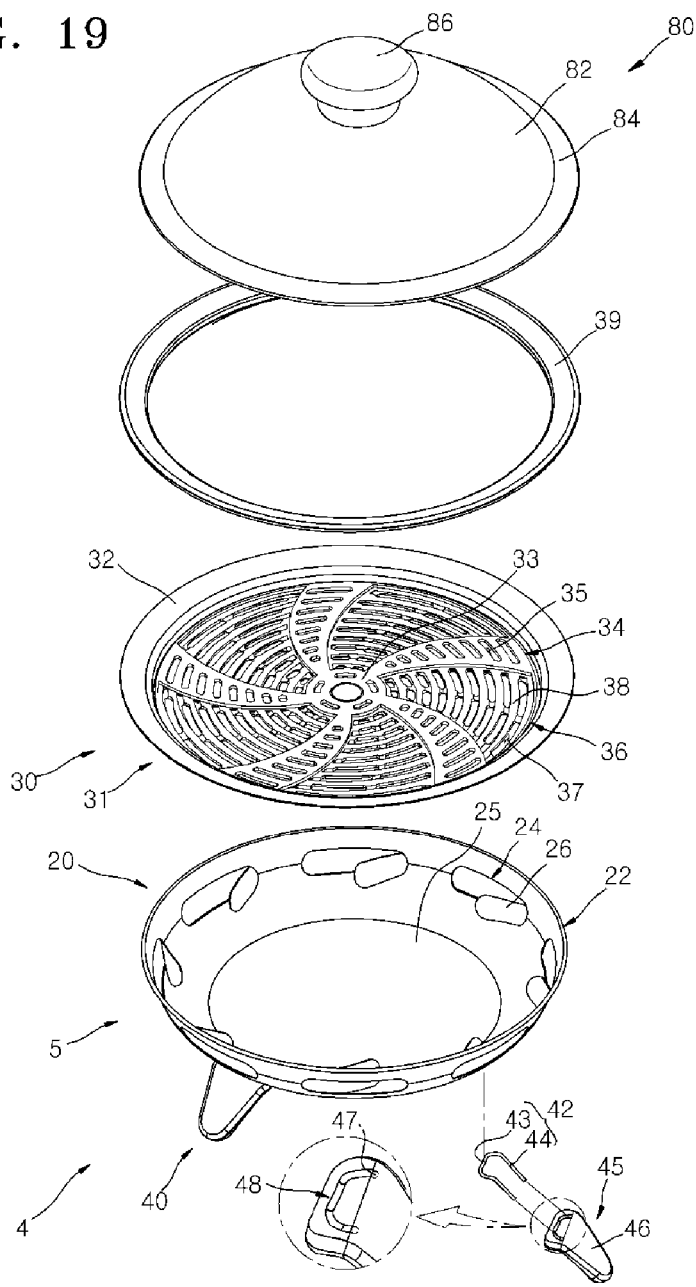
FIG. 19 is an exploded perspective view schematically illustrating an exemplary cooking container for an electronic oven in accordance with one or more embodiments of the present disclosure.
Figure 20:
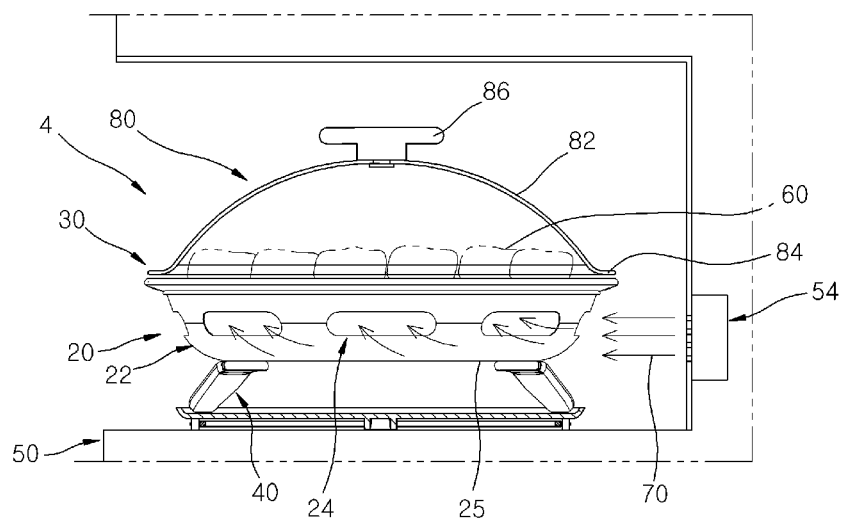
FIG. 20 is a view illustrating an exemplary cooking container in an electronic oven in accordance with embodiment(s) of the present disclosure during frying.

FIG. 19 is an exploded perspective view schematically illustrating an exemplary cooking container for an electronic oven in accordance with one or more embodiments of the present disclosure, and FIG. 20 is a view illustrating an exemplary cooking container in an electronic oven in accordance with embodiment(s) of the present disclosure during frying.

Referring to FIGS. 19 and 20, an exemplary cooking container 4 for an electronic oven in accordance with embodiment(s) of the present disclosure includes a housing unit 5 that has at a side thereof an entrance 14 through which hot air 70 enters, a support unit 30 on the housing unit 5 and on which one or more cooking objects 60 to be cooked by the hot air 70 are placed, and a cover 80 that covers the support unit 30 and/or blocks the movement of the hot air 70.

The housing unit 5 includes a housing body 20 and legs 40. Entrances 24 configured to supply hot air 70 to the inside of the housing body 20 are along the side surface of the housing body 20. The uppermost end or surface of the housing body 20 is open, and the lower end or underside of the housing body 20 is supported by the legs 40.

The housing body 20 in accordance with embodiment(s) of the present disclosure includes a housing side section 22, a housing bottom section 25, and inner guides 26.

The housing side section 22 which forms the side surface of the housing body 20 supports the periphery of the support unit 30, and has a ring or annular shape which extends downward.

The entrances 24 along the circumference of the housing side section 22 form passages through which the hot air 70 moves to the inside of the housing body 20.

The entrances 24 comprise or constitute slots or ovals that may extend horizontally. A plurality of entrances 24 are along the housing side section 22.

The housing bottom section 25 is horizontally secured to the lowermost end or surface of the housing side section 22 and forms the bottom of the housing body 20.

The upper ends of the entrances 24 may have a height the same as or lower than the height of the upper end of the hot air supply unit 54 from which the hot air 70 is discharged towards the side of the housing body 20. As a result, the hot air 70 may easily enter the entrances 24.

A portion of the hot air 70 supplied horizontally or substantially horizontally from the hot air supply unit 54 moves to the inside of the housing body 20 through the entrances 24 in the side surface of the housing side section 22, and the hot air 70 flowing above the entrances 24 may flow down the housing side section 22 along the curved surface of the housing side section 22 and enter the entrances 24. As a consequence, the heating time of the cooking object(s) 60 by the hot air 70 may be reduced or shortened.

The inner guides 26 are connected to the inner surface of the housing side section 22 and project into the housing side section 22. The inner guides 26 may have any of a variety of shapes without departing from the technical concept that they guide the movement of the hot air 70 that enters into the housing body 20 through the entrances 24.

The inner guides 26 in accordance with embodiment(s) of the present disclosure incline and/or project into the housing side section 22 from an end of a corresponding entrance 24. For example, the inner guides 26 may have a horizontal angle with respect to the housing side section 22.

The hot air 70 that enters into the entrances 24 is guided by the inner guides 26 and forms a vortex flow. As a result, the contact area and/or contact time of the hot air 70 with the cooking object(s) 60 may increase.

The cover body section 82 may have a dome-like or spherical cap shape. The cover body section 82 covers the support unit 30, and may block, restrict or restrain the movement of the hot air 70 that might otherwise move outside the cooking container 3.

Also, since the cover body section 82 defines therein a space in which the hot air 70 may stay, the heating time for cooking the cooking object(s) 60 may be reduced or shortened.

A junction member 84 configured to be brought into contact with the periphery of the support unit 30 and that may comprise an elastic material is on the periphery of the cover body section 82. The junction member 84 facilitates effective restriction and/or restraint of the movement of the hot air 70 within the cover body section 82.

The junction member 84 may have an annular or ring shape that projects outward from the periphery of the cover body 82. The lower surface of the junction member 84 comes into contact with the cover section 39 of the support unit 30, and may improve airtightness.

Hereinafter, operations of the exemplary cooking container 4 for an electronic oven in accordance with one or more embodiments of the present disclosure will be described in detail.

The hot air 70 produced by the convection heater unit 300 moves towards the side of the housing body 20, and the hot air 70 contacting the rounded surface of the housing side section 22 may enter the housing body 20 through the entrances 24.

The hot air 70 entering the housing body 20 through the entrances 24 rotates inside of the housing body 20, and its movement may be guided by the inner guides 26.

The hot air 70 creates a vortex flow inside of the housing body 20 may create another vortex flow while being rotated on or by the surfaces of the first support parts 34 in the support unit 30. As a result, the contact time of the support body section 31 and the cooking object(s) 60 with the hot air 70 may increase, thermal efficiency may improve, and the cooking time of the cooking object(s) 60 may decrease.

Furthermore, as the hot air 70 moving upward from the lowermost end or surface of the support unit 30 toward the uppermost end or surface of the support unit 30 stays (at least temporarily) in the concave grooves of the rounded support portions 38 in the second support parts 36, the contact time of the hot air 70 with the support body section 31 may increase, and heating of the support body section 31 may be easily implemented.

Meanwhile, the hot air 70 moving upward from the support unit 30 after heating the cooking object(s) 60 may be reflected by the inner surface of the cover 80, move downward from the cover 80, and provide secondary heat to the cooking object(s) 60. As a result, the cooking time may be reduced or shortened.

Since the hot air 70 moving upward after heating the cooking object(s) 60 stays inside the cover 80 and raises the temperature inside the cover 80, the cooking time of the cooking object(s) 80 under the cover 80 may be reduced or shortened.

By the above-described constructions, since the cooking containers 1, 2, 3 and 4 for an electronic oven in accordance with embodiments of the present disclosure carry out frying by heating the cooking object(s) 60 on the support unit 30 with the hot air 70, it is possible to decrease the likelihood of safety-related accidents due to use of oil, the nutritional and/or health benefits of the cooked food may increase, and the cooking cost may be reduced.

Also, since the hot air 70 entering the housing unit 5 heats the cooking object(s) 60 while rotating (at least partially or substantially) in a spiral pattern, the contact time of the hot air 70 with the cooking object(s) 60 may increase, and it may be possible to reduce the cooking time.

Further, the rounded support portions 38 which support the cooking object(s) 60 may have a convex upward shape. Thus, the contact area between the cooking object(s) 60 and the support unit 30 may decrease, the contact area between the hot air 70 and the cooking object(s) 60 may increase, and it may be possible to shorten the cooking time.

Moreover, since the residence time of the hot air 70 moving upward through the support unit 30 in the housing bodies 10 and 20 and/or inside the cover unit 80 may increase, the cooking time of the cooking object(s) 60 may be reduced or shortened, and the cooking cost may decrease.

According to embodiments of the present disclosure, it is possible to provide a cooking apparatus which can carry out not only general cooking but also frying.

According to embodiments of the present disclosure, since frying is carried out using the fat content in the cooking object(s), it is possible to prevent a safety-related accident due to high temperature oil, the nutritional and/or health benefits may increase, and the cooking cost may be reduced due to nonuse of oil.

According to embodiments of the present disclosure, the hot air entering the housing unit of a cooking container may heat the cooking object or objects while flowing in a spiral pattern. As a result, the contact time of the hot air with the cooking object(s) may increase, and it may be possible to shorten or reduce the cooking time and improve cooking performance.

According to embodiments of the present disclosure, rounded support portions configured to support the cooking object or objects may be convex facing upward, the contact area between the cooking object(s) and the support unit may decrease or be minimized, the contact area between the hot air and the cooking object(s) increases, the cooking time may decrease, and cooking performance may improve.

According to embodiments of the present disclosure, hot air flowing onto a housing side section from hot air supply units may flow downward on the rounded surface of the housing side section and enter an entrance of the cooking container. As a result, loss of hot air may be reduced, and it may be possible to reduce or shorten a cooking time.

According to embodiments of the present disclosure, the time during which the hot air moving upward through the support unit in the housing body stays inside a cover may increase. As a result, the time for heating the cooking object(s) may be reduced or shortened, and the cooking cost may be reduced.

Embodiments of the present invention have been disclosed above for illustrative purposes. Those skilled in the art will appreciate that various modifications, additions and substitutions are possible, without departing from the scope and spirit of the invention as disclosed in the accompanying claims.

While the cooking container for an electronic oven has been exemplified as being placed in a microwave oven for producing hot air, this is merely an illustration, and the cooking container for an electronic oven in accordance with the present disclosure may be used in other kinds of cookers and/or ovens.

What is claimed is:

1. A cooking container for an electronic oven, comprising:
  a housing unit having an entrance through which hot air can enter; and
  a support unit on the housing unit, configured to have placed thereon one or more cooking objects to be cooked by the hot air;
  wherein the housing unit comprises:
  a housing body having the entrance at a lower portion thereof, and open at an upper portion thereof; and
  legs supporting the housing body;
  wherein the housing body comprises:
  a housing side section supporting a periphery of the support unit;
  a housing bottom section extending inwardly from a lower end of the housing side section;
  a housing inside section extending upward from the housing bottom section, connected to the entrance, wherein an introduction space is inside the housing inside section, connected to the entrance, and wherein the housing inside section facing the introduction space has a convex curved shape; and
  guide projections having a spiral shape on a surface of the housing inside section that faces the introduction space, configured to guide and rotate the hot air.

2. The cooking container according to claim 1, further comprising:
  a cover configured to cover the support unit and/or block movement of the hot air.

3. The cooking container according to claim 1, wherein the housing side section has a rounded contour, and is sloped towards the housing body in a downward direction.

4. The cooking container according to claim 3, wherein the upper end of the housing body is at a position and/or a height equal to or higher than a hot air supply unit from which the hot air is discharged towards a side of the housing body.

5. The cooking container according to claim 1, wherein the housing bottom section has an annular shape, and the legs are fixed to the housing bottom section.

6. The cooking container according to claim 1, wherein the support unit comprises:
  a support body having a plurality of through-holes through which the hot air flows; and
  a cover section configured to cover an outer periphery of the support body.

7. The cooking container according to claim 6, wherein the support body comprises:
  a peripheral support part inside the cover section, having an annular shape;
  a central support part at a center portion of the support body section inside the peripheral support part;
  a plurality of first support parts having first through-holes through which the hot air passes, extending from the central support part toward the peripheral support part; and
  a plurality of second support parts between adjacent first support parts, and having a plurality of second through-holes through which the hot air passes.

8. The cooking container according to claim 7, wherein the second support parts extend downward more than the first support parts.

9. The cooking container according to claim 7, wherein the second support parts comprise rounded support portions having an arc-like shape and/or a convex upward shape, centered on the central support part.

10. The cooking container according to claim 2, wherein the cover comprises:
  a cover body configured to close the upper end of the support unit, having a dome-like or spherical cap shape; and
  a knob on the cover body section.

11. The cooking container according to claim 1, wherein each of the legs comprises:
  a leg frame fixed to an outer surface of the housing unit; and
  a leg cover configured to surround and/or receive the leg frame.

* * * * *